United States Patent
Ogawa

[19]

[11] Patent Number: 5,943,222
[45] Date of Patent: Aug. 24, 1999

[54] SELF-EXCITED RCC TYPE SWITCHING POWER SUPPLY APPARATUS

[75] Inventor: Tsutomu Ogawa, Shizuoka, Japan

[73] Assignee: Pioneer Electronic Corporation, Tokyo, Japan

[21] Appl. No.: 09/055,708

[22] Filed: Apr. 7, 1998

[30] Foreign Application Priority Data

Apr. 7, 1997 [JP] Japan ................................. 9-103900

[51] Int. Cl.⁶ ................................................. H02M 3/335
[52] U.S. Cl. ................................................. 363/19; 363/97
[58] Field of Search ................................ 363/18, 19, 89, 363/95, 97

[56] References Cited

U.S. PATENT DOCUMENTS

| | | | |
|---|---|---|---|
| 3,989,995 | 11/1976 | Peterson | 363/19 |
| 4,021,717 | 5/1977 | Furuishi et al. | 363/19 |
| 4,283,759 | 8/1981 | Koiki | 363/19 |
| 4,901,214 | 2/1990 | Hiramatsu et al. | 363/97 |
| 4,903,182 | 2/1990 | Pilukataitis et al. | 363/19 |
| 4,914,560 | 4/1990 | Oh et al. | 363/97 |
| 4,926,303 | 5/1990 | Sturgeon | 363/19 |
| 4,937,727 | 6/1990 | Leonardi | 363/97 |
| 4,958,268 | 9/1990 | Nagagata et al. | 363/19 |
| 5,412,555 | 5/1995 | Uramoto | 363/19 |
| 5,719,755 | 2/1998 | Usui | 363/19 |

*Primary Examiner*—Jeffrey Sterrett
*Attorney, Agent, or Firm*—Sughrue, Mion, Zinn, Macpeak & Seas, PLLC

[57] ABSTRACT

In a switching power supply apparatus including an output transformer having a primary winding, a secondary winding and a feedback winding, a DC power source supplying DC voltage to the primary winding of the output transformer, an oscillation switching element having one terminal connected to the primary winding of the output transformer and a control terminal connected to the feedback winding, and a rectifying and smoothing circuit connected to the secondary winding of the output transformer, the switching power supply apparatus is characterized by further comprising a control circuit for flowing current through the secondary winding of the output transformer to one direction and a direction opposite thereto during a predetermined period after a time point where voltage is generated in the secondary winding of the output transformer.

8 Claims, 7 Drawing Sheets

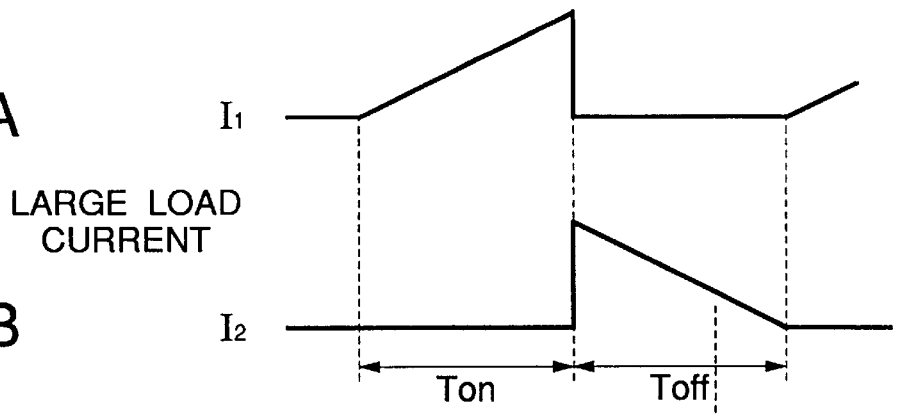
FIG.2A $I_1$
LARGE LOAD CURRENT
FIG.2B $I_2$
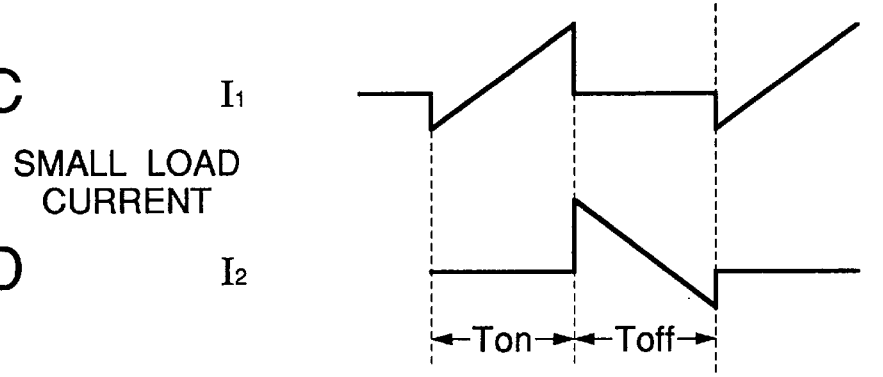
FIG.2C $I_1$
SMALL LOAD CURRENT
FIG.2D $I_2$
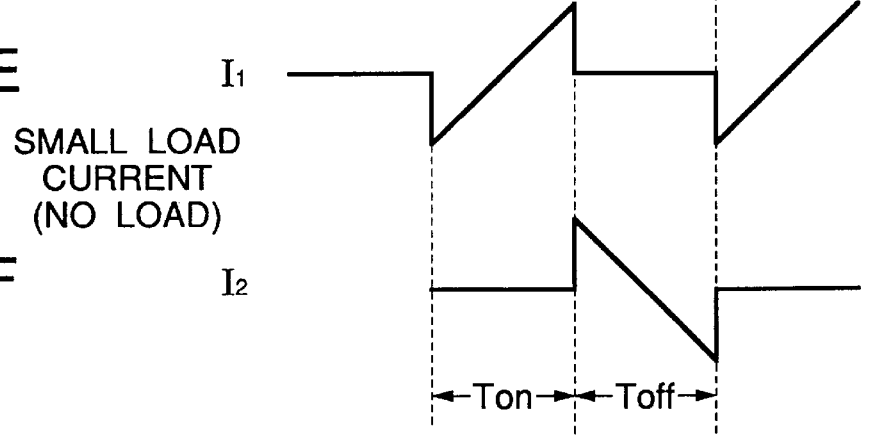
FIG.2E $I_1$
SMALL LOAD CURRENT (NO LOAD)
FIG.2F $I_2$
FIG.2G  OUTPUT OF ONE-SHOT MULTIVIBRATOR

PRIMARY CURRENT

Ton  Toff

SECONDARY CURRENT ns also decreases. In contrast, when the load resistor is large, the secondary current is induced before the electric charge accumulated in the smoothing capacitor 21 is discharged completely. Thus, the time period from the start of flowing of the secondary current to the termination of flowing thereof becomes short, so that the oscillation frequency becomes high and the output voltage also becomes high.

SELF-EXCITED RCC TYPE SWITCHING POWER SUPPLY APPARATUS

BACKGROUND OF THE INVENTION

1. Field of the Invention

The present invention relates to a switching power supply apparatus using a ringing choke converter (RCC) system.

2. Description of the Related Art

Conventionally, a self-excited RCC (ringing choke converter) serving as a self-excited converter apparatus has been widely employed as a switching power supply apparatus for low power due to the simple circuit configuration thereof. FIG. 6 shows a block diagram of a typical self-excited RCC type switching power supply apparatus. FIGS. 7A and 7B show waveforms of primary and secondary currents of an output transformer. The operation of the conventional switching power supply apparatus will be explained briefly with reference to FIGS. 6 and 7A, 7B.

When the switching power supply apparatus is supplied with AC power, an oscillation field effect transistor (FET) 5 is turned on by a starting resistor 6, so that primary current flows through the primary winding N1 of an output transformer 29 and increases linearly (Ton period in FIG. 7A).

Current is induced in a feedback winding NB due to the primary current, and the induced current is supplied to a charging capacitor 14 provided at a base terminal of a switching transistor 13 through a charging impedance formed by a resistor 18, diode 15, resistor 16 and zener diode 17 thereby to charge the charging capacitor. Then, the voltage of the base terminal of the switching transistor is increased to turn on the switching transistor 13. When the switching transistor 13 is turned on, the voltage of the collector terminal thereof becomes substantially zero, and so the oscillation FET 5 connected to the collector terminal is turned off. When the oscillation FET 5 is turned off (during Toff in FIG. 7A), secondary current is transiently induced into a secondary winding N2 due to counter electromotive force of the primary current accumulated in the primary winding N1.

The secondary current induced in the secondary winding N2 is charged in a smoothing capacitor 21 and so decreased linearly (FIG. 7B). At the time where the secondary current flowing through a rectifying diode 19 becomes zero, ringing phenomena appears at the primary winding N1 and feedback winding NB side.

Electric charge accumulated in the charging capacitor 14 is discharged by the ringing phenomena thereby to turn on the oscillation FET 5 again. Thereafter, the aforesaid operation is repeated to cause self-excitation between the primary side and the secondary side of the output transformer thereby to supply DC voltage to the secondary side. The self-excited RCC type switching power supply apparatus is arranged in this manner.

As described above, the repetition frequency of the self-excitation is determined by a time period (Ton period) charging the charging capacitor 14 provided at the feedback circuit and a time period (Toff period) from the start of flowing of the secondary current to the termination of flowing thereof. When a load resistor connected to an output terminal is small, electric charge accumulated in the smoothing capacitor 21 is discharged in a short time. Thus, the time period from the start of flowing of the secondary current to the termination of flowing thereof becomes long, so that the repetition frequency (oscillation frequency) of the self-excitation becomes relatively low and the output voltage A shunt regulator 24 is provided at the output terminal 27 side in order to suppress that the output voltage becomes equal to or larger than a desired voltage. The output voltage is divided by resistors 25 and 26, and the divided voltage is supplied to the control terminal of the shunt regulator 24. Since the shunt regulator 24 is operated to flow current therethrough when voltage equal to or larger than the desired voltage is applied to the control terminal thereof, current flowing into the photo diode 12b of a photo coupler 12, which is connected to the output terminal 27 through the shunt regulator 24 and a resistor 23, increases and so light emitting quantity from the photo diode becomes large. In contrast, a photo transistor 12a provided at the feedback circuit side is turned on upon receiving the light emitted from the photo diode 12b thereby to reduce an impedance between the collector and emitter terminals thereof.

Since the photo transistor 12a is connected to the charging capacitor 14 through a resistor 9 and a diode 11, the charging impedance becomes lower and so a time required for charging the capacitor becomes shorter. In this manner, since the charging time of the capacitor becomes short, the primary current decreases and hence the secondary current induced in the secondary winding side also decreases, whereby the output voltage can be suppressed to a small voltage.

As described above, although the self-excited RCC type switching power supply apparatus is able to suppress the variation of the output voltage to a small value by employing the shunt regulator 24 and the photo coupler 12 even when the output voltage varies due to the change of the load resistor, the apparatus can not suppress the oscillation frequency to a small value. In particular, when the aforesaid self-excited RCC type switching power supply apparatus is employed as a power supply for a driving circuit of a plasma display panel (hereinafter abbreviated as PDP), current becomes substantially zero during the discharge maintaining period of the PDP, and so the load current of the switching power supply apparatus does not flow thereby to increase the oscillation frequency. Accordingly, a circuit gain of the apparatus becomes large, so that the apparatus is susceptible to oscillate and the transient response thereof is degraded. In contrast, when a separately-controlled type switching power supply apparatus is employed, the size of the circuit arrangement of the apparatus becomes large and a large-sized output transformer is required.

SUMMARY OF THE INVENTION

The present invention has been made in view of the aforesaid problem and intends to provide a self-excited RCC type switching power supply apparatus which can suppress amounts of variation of the output voltage and the oscillation frequency and be operated stably with a simple circuit arrangement and also can suppress the maximum oscillation frequency even in a no-load state, even if the apparatus is employed for a driving circuit such as one for a PDP in which a load current varies greatly in a manner that a large current flows during an all reset period but a current merely substantially equal to zero flows during a discharge maintaining period.

According to a first aspect of the invention, there is provided a switching power supply apparatus, comprising an output transformer having a primary winding; a secondary winding and a feedback winding; a DC power source supplying DC voltage to the primary winding of the output transformer; an oscillation switching element having one terminal connected to the primary winding of the output transformer and a control terminal connected to the feedback winding; and a rectifying and smoothing circuit connected to the secondary winding of the output transformer; a control circuit for flowing current through the secondary winding of the output transformer in one direction and a direction opposite thereto during a predetermined period after a time point where voltage is generated in the secondary winding of the output transformer.

According to a second aspect of the invention, in the switching power supply apparatus recited in the first aspect of the invention, the rectifying and smoothing circuit includes a diode connected in series to the secondary winding of the output transformer and a capacitor for smoothing rectified output from the diode, and the rectify control circuit includes a second switching element connected to both ends of the diode and a one-shot multivibrator for turning on the second switching element during the predetermined period in response to a rising of the voltage generated in the secondary winding of the output transformer.

According to a third aspect of the invention, in the switching power supply apparatus recited in the first or second aspect of the invention, the predetermined period is set to be shorter than a minimum oscillation period of the oscillation switching element.

With the switching power supply apparatus thus structured, the maximum oscillation frequency is set within a desired predetermined frequency.

The above and other objects and features of the present invention will be more apparent from the following description taken in conjunction with the accompanying drawings.

BRIEF DESCRIPTION OF THE DRAWINGS

In the drawings:

FIGS. 2A to 2G are diagrams showing waveforms of the current from an output transformir in the switching power supply apparatus according to the embodiment of the present invention;

DETAILED DESCRIPTION OF THE PREFERRED EMBODIMENTS

Now, a description will be given in more details of preferred embodiments of the present invention with reference to the accompanying drawings.

Figure 1:
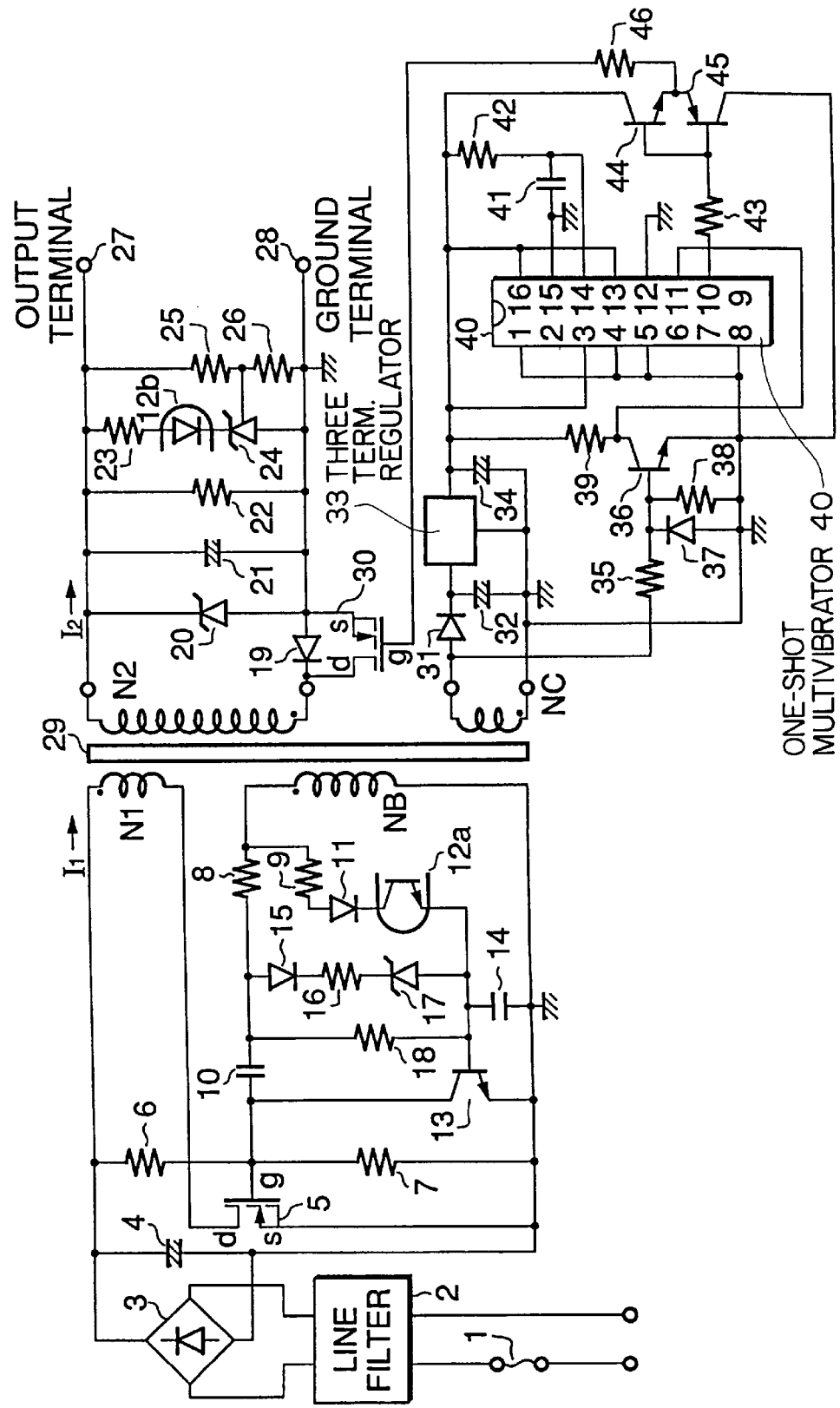
FIG. 1 is a block diagram showing a switching power supply apparatus according to an embodiment of the present invention.

FIG. 1 shows a block diagram of a switching power supply apparatus according to an embodiment of the present invention. In the following explanation of the arrangement of the switching power supply apparatus, since the portion of the switching power supply apparatus same as that of the prior art is known as the self-excited RCC type switching power supply apparatus, explanation will be made only as to a portion having been improved as the switching power supply apparatus according to the embodiment of the present invention. In the following figures, portions having the same functions as those of the prior art are labeled with the same reference numerals.

The switching power supply apparatus of the embodiment differs from the prior art in points that the rectifying diode 19 which is provided at the one end of the secondary winding N2 of the output transformer 29 in the prior art is provided at the other end thereof in the embodiment, that the diode 19 of the embodiment is disposed to a direction opposite to that of the prior art, and that in the embodiment a control winding NC is provided at the secondary side of the output transformer 29 so as to form a rectify control circuit.

In more detail, the one end of the secondary winding N2 of the output transformer 29 is connected to the output terminal 27, while the other end thereof is connected to the cathode terminal side of the rectifying diode 19 and the anode terminal side of the rectifying diode is connected to a ground terminal.

In contrast, the other terminal of the control winding NC is connected to the ground terminal, while one end thereof is connected to the base terminal of a transistor 36 through the anode terminal of a diode 31 and a resistor 35. The cathode terminal of the diode 31 is connected to the ground terminal through a capacitor 32 and connected to the input terminal of a three-terminal regulator 33.

Figure 4:
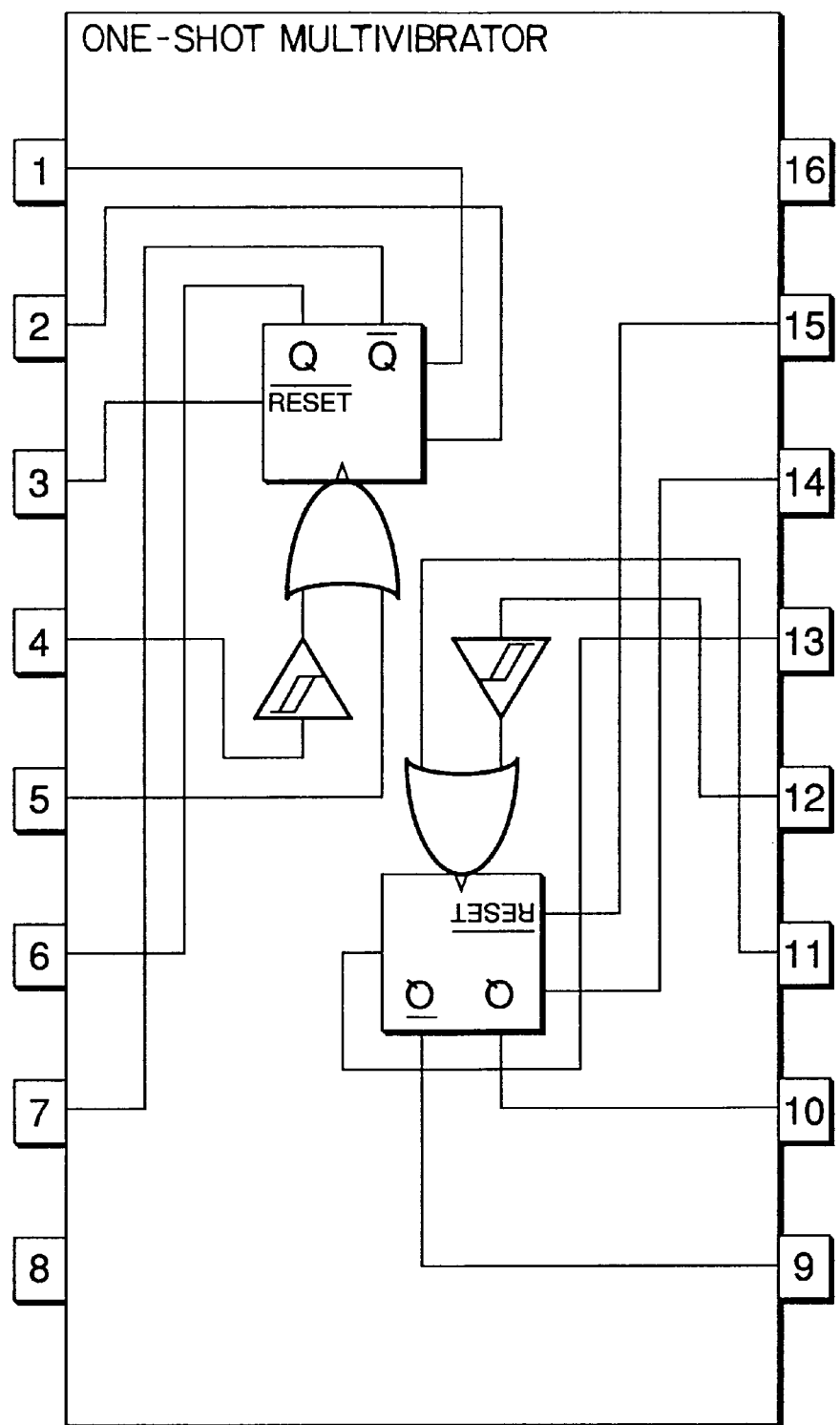
FIG. 4 is a diagram showing an equivalent circuit of a one-shot multivibrator 40 used in FIG. 1.

A smoothing capacitor 34 is connected between the output terminal of the three-terminal regulator 33 and the ground terminal so that smoothed output voltage from the three-terminal regulator 33 is supplied to the rectify control circuit having a one-shot multivibrator 40. The one-shot multivibrator 40 is configured by an integrated circuit (IC) "MC14538B" manufactured by Motorola Co., Ltd. FIG. 4 shows an equivalent circuit of such a one-shot multivibrator.

A parallel circuit of a diode 37 and a resistor 38 is provided between the base terminal of the transistor 36 and the ground terminal in a manner that the emitter terminal thereof is connected to the ground terminal and the collector terminal thereof is connected to the output terminal of the three-terminal regulator 33 through a resistor 39.

The collector terminal of the transistor 36 is connected to the 11-th pin of the one-shot multivibrator 40. The 12-th pin of the one-shot multivibrator is connected to the ground terminal. The 14-th pin of the one-shot multivibrator is a terminal used for setting a time constant. A capacitor 41 is connected between the 14-th pin and the ground terminal and a resistor 42 is connected between the 14-th pin and the output terminal of the three-terminal regulator 33.

The base terminals of an NPN transistor 44 and a PNP transistor 45 are connected to the 10-th pin of the output terminal of the one-shot multivibrator 40 through a resistor 43. The emitter terminals of these transistors are connected in common and the common emitter terminal thereof is connected to the gate terminal of an N-type MOSFET 30 (hereinafter referred to as a control FET) serving as a second switching element through a resistor 46. The collector terminal of the PNP transistor 45 is connected to the ground terminal and the collector terminal of the NPN transistor 44 is connected to the output terminal of the three-terminal regulator 33. The drain terminal of the control FET 30 is connected to the cathode terminal of the rectifying diode 19 and the source terminal thereof is connected to the anode terminal of the rectifying diode 19.

The operation of the switching power supply apparatus according to the embodiment of the present invention will be explained with reference to FIGS. 1 and 2A to 2G. FIGS. 2A to 2G are waveform diagrams of the current from the output transformer.

Firstly, the explanation will be made as to a case where a current flowing into a load is small.

When AC power is supplied to the switching power supply apparatus, AC voltage is supplied to a line filter 2 through a fuse 1. The output voltage of the line filter is full-wave rectified by a diode bridge 3 thereby to generate positive DC voltage at the output terminal of the diode bridge 3. The DC voltage is smoothed by a smoothing capacitor 4 and the DC voltage thus smoothed is supplied to the one end of the primary winding N1 of the output transformer 29. In this case, the smoothed voltage is divided by starting resistors 6 and 7 connected between the one end of the primary winding N1 and the ground terminal, and the divided voltage is applied to the gate terminal of an N-type MOSFET 5 serving as an oscillation switching element (hereinafter called an oscillation FET), whereby the oscillation FET 5 is turned on to flow primary current I1 through the primary winding N1.

The primary current thus flowed into the primary winding N1 is induced in the feedback winding NB thereby to gradually increase the voltage at the one end of the feedback winding NB. The voltage thus generated at the one end of the feedback winding NB is applied to the charging capacitor 14 through a feedback circuit formed by the resistor 18, diode 15, resistor 16 and zener diode 17 to gradually charge the charging capacitor. The voltage of the charging capacitor 14 thus charged raises the voltage of the base terminal of the switching transistor 13 and then turns on the switching transistor when the voltage exceeds the base-emitter voltage (Vbe) thereof. As a result, the voltage of the collector terminal of the switching transistor is reduced to substantially zero volt to turn off the oscillation FET 5.

When the oscillation FET 5 is turned off, the other end of the primary winding N1 is placed in an open state thereby to stop the primary current I1. At this time, electric energy accumulated in the primary winding N1 is transiently induced in the secondary winding N2.

Since the control FET 30, which is provided at the other end of the secondary winding N2 and connected to the rectifying diode 19, is being turned on by the rectify control circuit described later, a secondary current I2 induced in the secondary winding N2 is charged in the smoothing capacitor 21.

Similarly, the electric energy accumulated in the primary winding N1 is also transiently induced in the control winding NC provided at the secondary side of the output transformer 29. The induced voltage is rectified by the diode 31 and applied to the three-terminal regulator 33, which in turn outputs a predetermined voltage (for example, 12 volt) to supply the voltage to the rectify control circuit.

Further, the induced voltage is supplied to the base terminal of the transistor 36 through the resistor 35 provided at the one end of the control winding NC to turn on the transistor 36, whereby the voltage of substantially zero volt of the collector terminal thereof is supplied to the 11-th pin of the one-shot multivibrator 40.

The one-shot multivibrator 40 outputs the voltage of about 12 volt to the 10-th pin thereof during a period of a time constant (hereinafter called a control time Tc) determined by the values of the capacitor 41 and the resistor 42 connected to the 14-th pin when a low-level voltage (about zero volt) is applied to the 11-th pin. Since the 10-th pin is connected to the base terminals of the NPN transistor 44 and the PNP transistor 45 through the resistor 43, the NPN transistor 44 is made turn on and the PNP transistor 45 is made turn off. Thus, the voltage of the common emitter terminal becomes almost 12 volt, whereby the control FET 30 is made to turn on thereby placing the rectifying diode 19 in a short-circuited state during the control time Tc. In other words, as shown in FIG. 2G, the rectifying diode 19 is in a short-circuited state during the period of Tc after a time point where the secondary current I2 is generated.

The secondary current I2 induced in the secondary winding N2 is charged in the smoothing capacitor 21 and hence decreases linearly to almost zero. In this case, in the case where the load resistor is large and the load current is small as shown in FIGS. 2C, 2D, 2E and 2F, the rectifying diode 19 is kept to be in a short-circuited state by the control FET 30 even when the secondary current I2 has decreased to almost zero since the one-shot multivibrator 40 is during the control time Tc. Thus, the secondary current I2 generated by the charge accumulated in the smoothing capacitor 21 flows to the ground terminal side through the secondary winding N2. That is, current, flowing in a direction opposite to the secondary current I2 which was at first induced from the primary current in the primary winding N1 (hereinafter called secondary reverse current), flows to the ground terminal side.

In contrast, since the voltage of the 10-th pin of the one-shot multivibrator 40 shifts to a low level upon the termination of the control time Tc determined by the values of the capacitor 41 and the resistor 42 connected to the 14-th pin, the PNP transistor 44 is turned off thereby to shift the voltage of the common emitter terminal to a low level, thereby turning off the control FET 30.

When the control FET 30 is turned off, the ringing phenomena appears between the primary winding N1 and the feedback winding NB such that the primary winding N1 and the feedback winding NB are excited by the secondary reverse current I2 flowing through the secondary winding N2. Since the secondary reverse current is a current of negative polarity, the voltage of the ground terminal of the primary side is shifted to the negative value side. Further, since the charge of the charging capacity 14 is discharged, the oscillation FET 5 is turned on.

In contrast, when the load current is large, the secondary current I2 becomes large as shown in FIGS. 2A and 2B. Thus, the control time Tc of the one-shot multivibrator 40 terminates before the secondary current I2 decreases to zero thereby to turn off the control FET 30 and activate the rectifying diode 19. Thus, the operation like the aforesaid prior art is performed with the arrangement like the prior art.

Since the voltage of the ground terminal of the primary side is shifted to the negative value side, the primary current I1 of the primary winding N1 increases linearly from the negative value side to the positive value side.

In other words, as shown in FIGS. 2C and 2E, during the period where the oscillation FET 5 is in an on state, at first the primary current I1 increases from the negative value side to the positive value side and, when the current value reaches zero, increases linearly from zero to the positive value side like the prior art. Further, as shown in FIGS. 2D and 2F, the secondary current I2 decreases from the positive value side to the negative value side and then flows to the reverse direction when decreases from zero to the negative value side.

In the switching power supply apparatus according to the embodiment of the present invention, the repetition frequency of the self-excitation is determined by the Ton time of the oscillation FET 5 and the time period (control time Tc) from the turning-on of the control FET 30 of the rectify control circuit to the turning-off thereof. Accordingly, when the constants of the time constant are set such that the Ton time is substantially same as the control time Tc, the oscillation frequency with a duty ratio of 50% can be obtained. When the control time Tc is set to be shorter than the Ton time of the oscillation FET 5, the maximum oscillation frequency does not depend on the Toff time which is influenced by the variation of the load current because the maximum oscillation frequency is set by the control time Tc. Accordingly, a desired maximum oscillation frequency can be set without depending on the variation of the load current.

Figure 6:
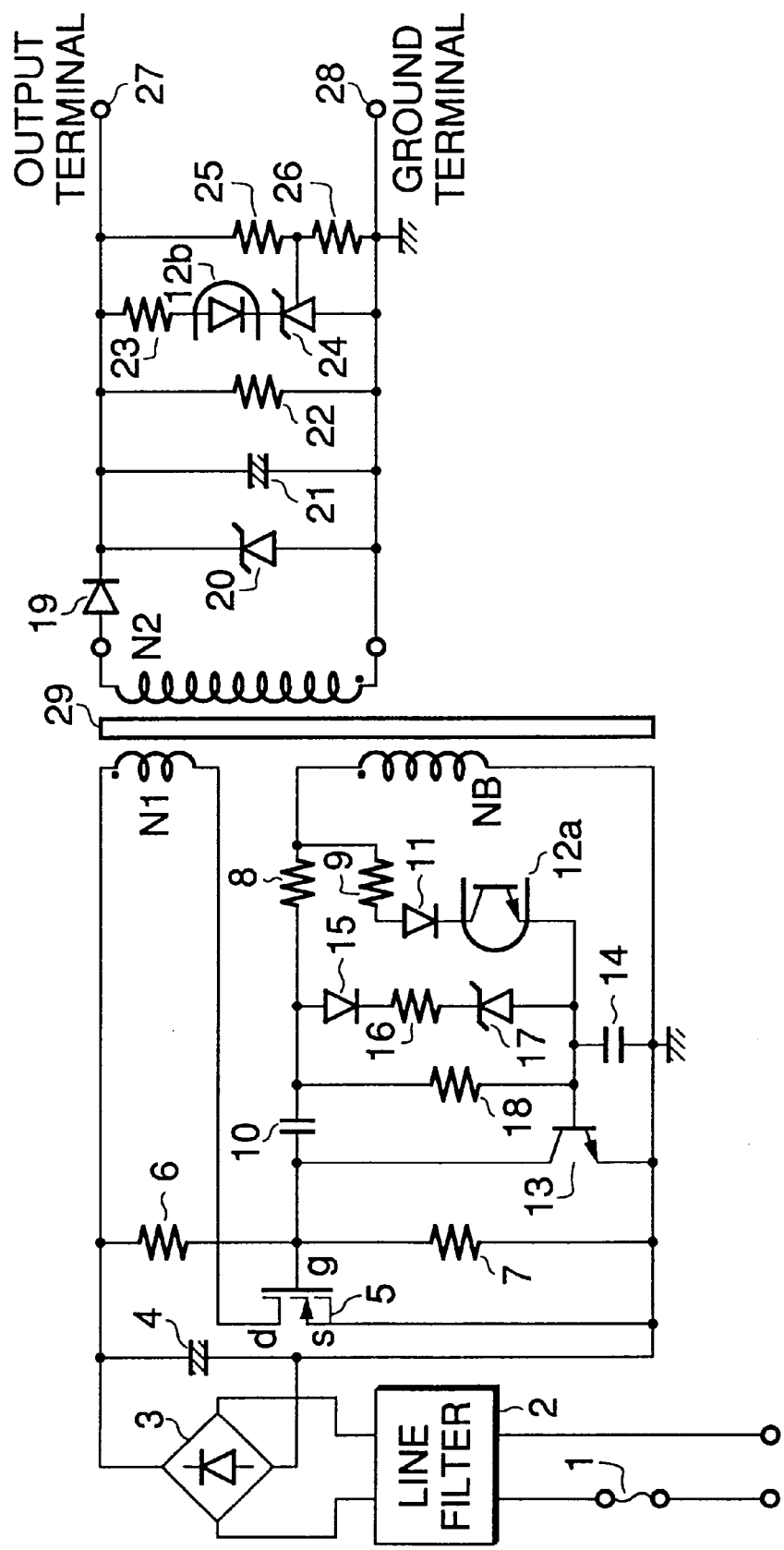
FIG. 6 is a block diagram of a self-excited RCC type switching power supply apparatus in the prior art.
Figures 7A, 7B:
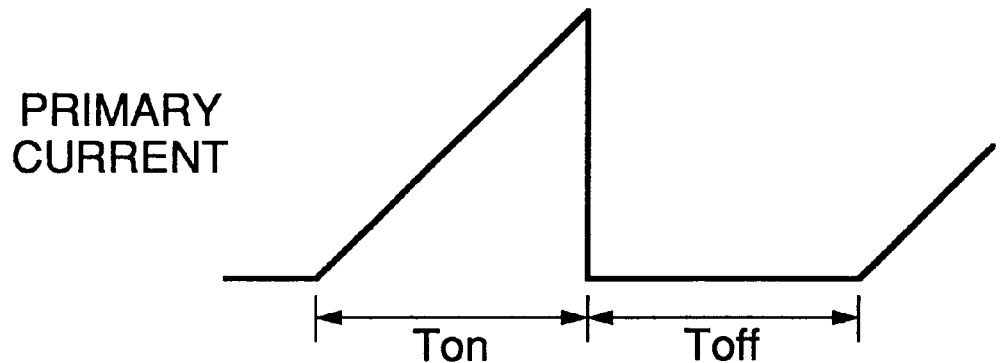
FIGS. 7A and 7B are diagrams showing waveforms of the output transformer of the self-excited RCC type switching power supply apparatus in the prior art.

FIGS. 2A to 2G show waveforms of the primary and secondary currents for the respective values of the load current. For example, when the load resistor is large, as shown in FIGS. 2C and 2D, the area of the positive value side of the load current waveform is larger than that of the negative value side thereof. Thus, the positive current is supplied to the output terminal corresponding to the difference between the load current of the positive value side and that of the negative value side. Further, when the load resistor becomes larger to be a no-load condition, as shown in FIGS. 2E and 2F, the area of the positive value side of the load current waveform is substantially same as that of the negative value side thereof, so that the current supplied to the output terminal is substantially zero. In contrast, when the load resistor is small, the current supplied to the output terminal is same as that of FIG. 6.

Figure 3A:
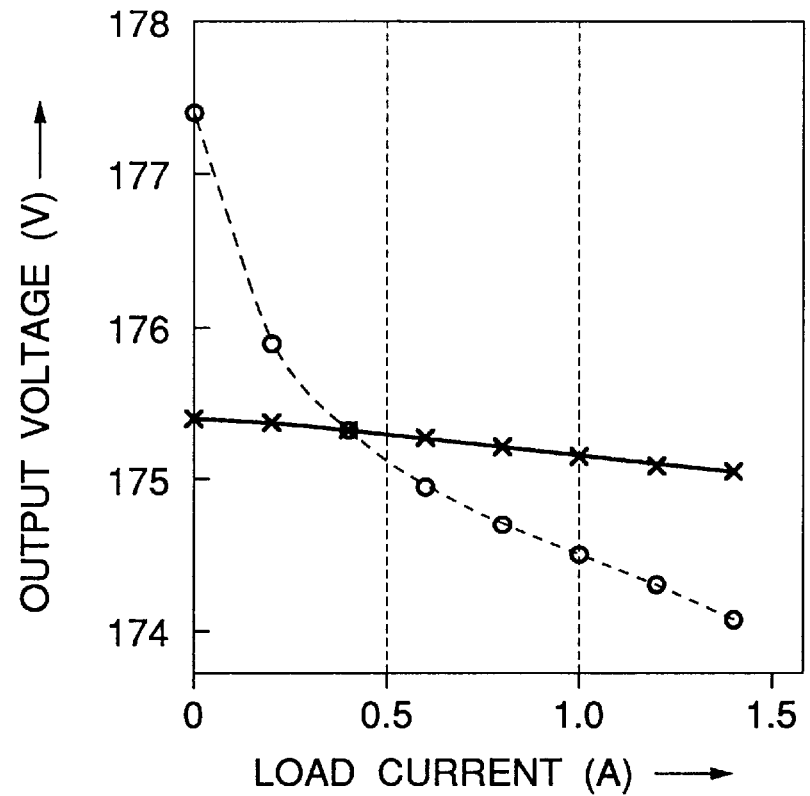
FIGS. 3A and 3B are characteristic diagrams of the output voltage and the oscillation frequency relative to the load current in the switching power supply apparatus according to the embodiment of the present invention.
Figure 3B:
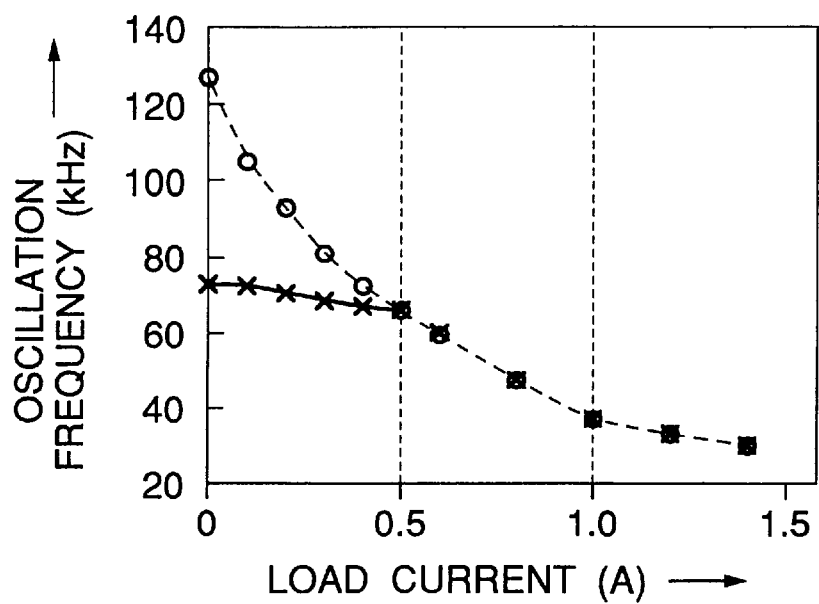

FIGS. 3A and 3B are diagrams showing the relation of the output voltage and the oscillation frequency relative to the load current in the switching power supply apparatus according to the embodiment of the present invention. In FIGS. 3A and 3B, dotted lines represent the operation characteristics of the prior art and steady lines represent the operation characteristics of the switching power supply apparatus according to the embodiment of the present invention. In the load current vs. output voltage characteristics shown in FIG. 3A, in the case of the no-load state (that is, the load current is zero), the output voltage increases to about 177.5 volt in the prior art, while the output voltage is suppressed to about 175.5 volt in the embodiment of the present invention. Further, with respect to an amount of change of the output voltage responsive to the change of the load current, such an amount is about 3.5 volt in the prior art, while an amount is suppressed to about 0.5 volt in the embodiment of the present invention.

In contrast, in the load current vs. oscillation frequency characteristics shown in FIG. 3B, in the case of the no-load state, the maximum oscillation frequency increases to about 130 kHz in the prior art, while the maximum oscillation frequency is suppressed to about 70 kHz at maximum in the embodiment of the present invention. Similarly, with respect to an amount of change of the maximum oscillation frequency responsive to the change of the load current, such an amount is about 100 kHz in the prior art, while an amount is suppressed to about 40 kHz at maximum in the embodiment of the present invention.

While, in the switching power supply apparatus according to the embodiment of the present invention, an N-type MOSFET is employed as the control FET, the control FET is not limited to the N-type MOSFET since similar technical advantage can be obtained when the control FET is formed by a high-frequency switch etc.

Further, while, in the aforesaid embodiment, the present invention is applied to the positive-polarity switching power supply apparatus, similar technical advantage can be obtained when the present invention is applied to the negative-polarity switching power supply apparatus. Furthermore, the position and direction of the rectifying diode 19 used at the secondary winding side is not limited to those of the aforesaid embodiment. Furthermore, the arrangement of the switching power supply portion of the present invention is not limited to that of the aforesaid embodiment and the present invention may be applied to various types of switching power supply.

Figure 5:
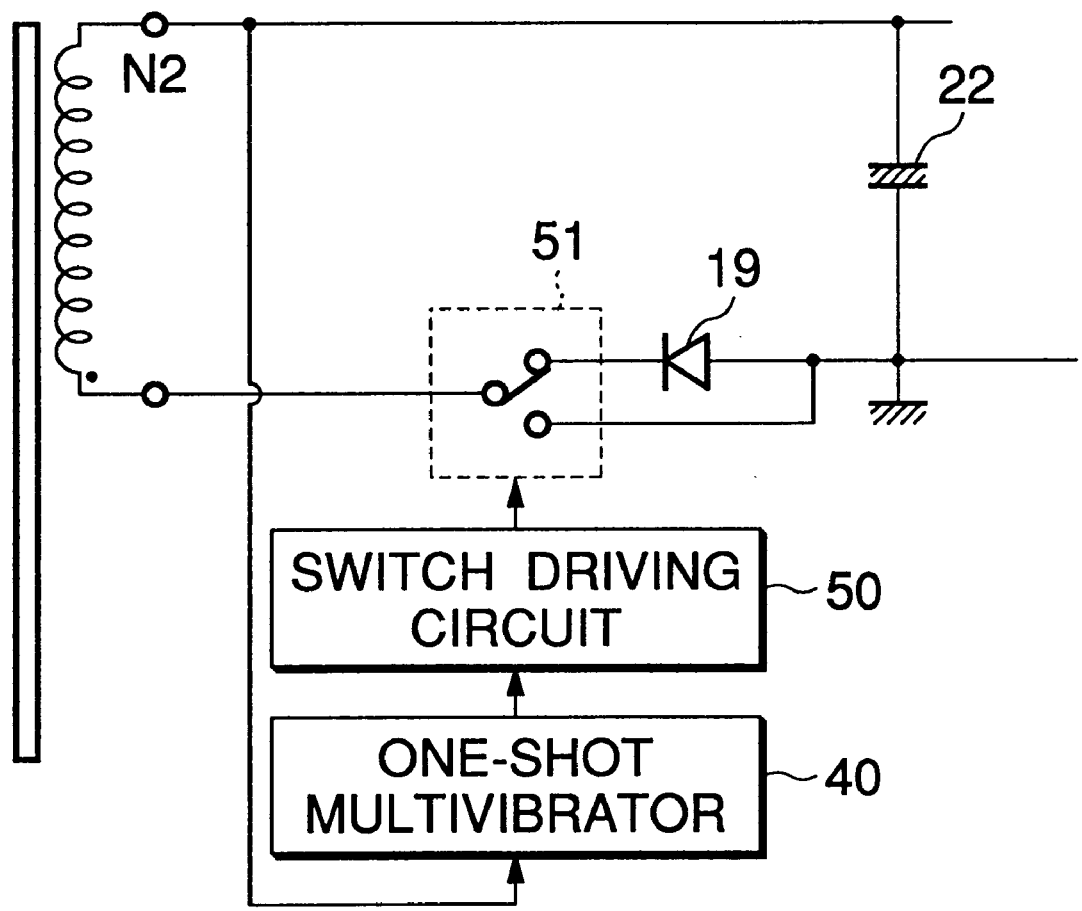
FIG. 5 is diagram showing another embodiment of the present invention.

FIG. 5 shows the arrangement of another embodiment of the present invention. This embodiment is arranged in a manner that a switch 51 is changed over between the path for connecting the rectifying diode 19 to the secondary winding N2 and the path for bypassing the rectifying diode 19, and the switch 51 is controlled by the one-shot multivibrator 40 and a switch driving circuit 50. According to such an embodiment, like the aforesaid first embodiment, during the time period corresponding to the predetermined control time Tc where the one-shot multivibrator 40 is driven, the switch driving circuit 50 is driven thereby to change over the switch 51 to the path for bypassing the rectifying diode 19. In contrast, after the lapse of the predetermined control time Tc, the switch 51 is changed over to the path of the rectifying diode 19 side, whereby the operation similar to that of the first embodiment is performed.

According to the switching power supply apparatus of the embodiment of the present invention, the maximum oscillation frequency in a no-load state can be set within the desired frequency with simplified circuit arrangement, and the circuit loss is made small and stable operation can be performed since amounts of variation of the output voltage and the oscillation frequency are small.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A switching power supply apparatus, comprising:
    an output transformer having a primary winding, a secondary winding and a feedback winding;
    a DC power source for supplying DC voltage to said primary winding of said output transformer;
    an oscillation switching element having one terminal connected to said primary winding of said output transformer and a control terminal connected to said feedback winding;
    a rectifying and smoothing circuit connected to said secondary winding of said output transformer; and
    a control circuit for passing current through said secondary winding of said output transformer in a first direction and a second direction opposite said first direction during a predetermined period after a time point when voltage is generated in said secondary winding of said output transformer, wherein said control circuit comprises:
- a timing circuit for determining said predetermined period; and
- a control winding disposed at a secondary side of said output transformer for triggering said timing circuit.

2. A switching power supply apparatus according to claim 1, wherein said rectifying and smoothing circuit includes a diode connected in series to said secondary winding of said output transformer and a capacitor for smoothing a rectified output from said diode; and
- wherein said control circuit includes a second switching element connected in parallel to said diode and wherein said timing circuit comprises a one-shot multivibrator for turning on said second switching element during said predetermined period in response to a rising of the voltage generated in said secondary winding of said output transformer.

3. A switching power supply apparatus according to claim 2, wherein said second switching element is a field effect transistor.

4. A switching power supply apparatus according to claim 2, wherein said predetermined period is set to be shorter than a minimum oscillation period of said oscillation switching element.

5. A switching power supply apparatus according to claim 2, wherein said diode includes an anode and a cathode, wherein said diode is connected in series between said secondary winding of said output transformer and a ground terminal, wherein said anode is connected to said ground terminal and said cathode is connected to said secondary winding of said output transformer.

6. A switching power supply apparatus according to claim 2, wherein said control winding is connected, through a control winding diode, to a voltage regulator, wherein said voltage regulator provides a regulated voltage for said control circuit.

7. A switching power supply apparatus according to claim 6, wherein said control circuit further comprises:
- a timing capacitor connected to said one-shot multivibrator; and
- a timing resistor connected to said one-shot multivibrator;
- wherein said timing capacitor and said timing resistor determine the length of said predetermined period.

8. A switching power supply apparatus according to claim 1, wherein said predetermined period is set to be shorter than a minimum oscillation period of said oscillation switching element.

* * * * *